United States Patent [19]

Fraser

[11] Patent Number: 4,832,252

[45] Date of Patent: May 23, 1989

[54] PARTS FOR AND METHODS OF REPAIRING TURBINE BLADES

[75] Inventor: Michael J. Fraser, Near Worcester, England

[73] Assignee: Refurbished Turbine Components Limited, Droitwich, England

[21] Appl. No.: 133,527

[22] Filed: Dec. 16, 1987

[30] Foreign Application Priority Data

Dec. 20, 1986 [GB] United Kingdom ............... 8630502

[51] Int. Cl.$^4$ .................... F01D 5/28; B23P 15/04; B23K 31/00

[52] U.S. Cl. .................... 228/119; 228/226; 228/231; 228/232; 29/402.13; 29/402.16; 29/156.8 B; 416/224; 416/241 R

[58] Field of Search ............... 228/119, 175, 225, 226, 228/229, 231, 232; 29/402.11, 402.13, 402.16, 156.8 B; 416/224, 241 R

[56] References Cited

U.S. PATENT DOCUMENTS

| | | | |
|---|---|---|---|
| 3,564,689 | 2/1971 | Hirtenlechner | 29/156.8 B |
| 3,854,189 | 12/1974 | Ezis et al. | 29/156.8 B |
| 4,141,127 | 2/1979 | Cretella et al. | 29/156.8 B |
| 4,214,355 | 7/1980 | Zelahy | 29/402.13 |
| 4,241,110 | 12/1980 | Ueda et al. | 29/156.8 B |
| 4,611,744 | 9/1986 | Fraser et al. | 29/156.8 B |

FOREIGN PATENT DOCUMENTS

| | | | |
|---|---|---|---|
| 8336 | 1/1978 | Japan | 29/156.8 B |
| 162008 | 12/1979 | Japan | 416/224 |
| 162010 | 12/1979 | Japan | 416/224 |
| 185897 | 10/1984 | Japan | 416/224 |
| 215905 | 12/1984 | Japan | 416/224 |
| 178599 | 8/1986 | Japan | 416/224 |
| 1006786 | 3/1983 | U.S.S.R. | 416/224 |
| 988 | 5/1980 | World Int. Prop. O. | 29/156.8 B |

Primary Examiner—Nicholas P. Godici
Assistant Examiner—Samuel M. Heinrich
Attorney, Agent, or Firm—Parmelee, Miller, Welsh & Kratz

[57] ABSTRACT

A part and method for repairing a high velocity fluid flow machine part, for example a turbine blade comprises an insert which may be made from a piece of material the same as the turbine blade and prior to attachment to the blade has an edge region hardened by any suitable means, for example induction hardening, the insert then being secured to the blade by welding or brazing, the weld or braze material being of a relatively soft nature to provide a cushion between the insert and the blade so as to minimize the occurrence of stress corrosion cracking.

7 Claims, 3 Drawing Sheets

PARTS FOR AND METHODS OF REPAIRING TURBINE BLADES

BACKGROUND OF THE INVENTION

1. Field of the Invention

The present invention relates to parts for and methods of repairing machines and is primarily but not exclusively concerned with high velocity fluid flow machinery such as turbines, and in particular turbine blades, nozzles, buckets and similar parts all hereinafter referred to for convenience as turbine blades.

Turbine blades in particular are subjected to wear during use and particularly in the case of steam turbines, the outer end of the turbine blades in a rotor assembly as the part which has the greatest linear speed in use and it is the outer leading end that is most prone to erosion.

Erosion generally occurs because of contact between the turbine blades and particles carried by the steam and also with the steam itself.

The high pressure end of a steam turbine, for example, is subjected to relatively hot steam and damage to the turbine blades is generally caused due to contact with particles of solid matter carried by the steam. At the low pressure end of the turbine the steam is at a low temperature and hence the water condenses more readily and considerable erosion occurs because of impact between the turbine blades and droplets of water.

2. Description of the Prior Art

Because of the known phenomenon of erosion, particularly at the leading outer edge of a turbine blade, it is quite usual to make that part of the blade as an insert made from a suitable hardened steel or from another hard material such as Stellite. Such an insert may be secured to the blade by brazing or welding for example.

Sometimes turbine blades are formed without such an insert and after same use when repair is necessary such an insert may be secured to the blades by cutting away the damaged part of the blade and securing, for example by brazing, a Stellite insert in position.

Whereas such inserts are very satisfactory and can prolong the life of the blade considerably, problems do occur in the securing of such inserts to the blade itself, such problems have at least partially been overcome in respect of certain types of blade by methods of repair proposed by the applicants and described in British patent specification Nos. 2, 091,139; 2,114,921; 2,124,126 and 2,144,361.

Problems occur during the securing of, for example, a Stellite shield to the blade because of the different nature of the materials to be joined together. A turbine blade is commonly made from a chrome steel, for example 12% chrome steel, and the securing by brazing or welding of the Stellite shield to such a blade involves the application of considerable thermal energy to the blade itself for which some compensation can be made by pre-heating the blade before the welding or brazing operation, controlled selective heating during the welding or brazing operation and post welding stress relief heating.

If such repairs can be carried out under controlled conditions then the chances of subsequent failure occurring are reduced. However, such careful control may require the complete dismantling of the turbine so that the blade to be repaired can be separated therefrom so as to be repaired in a gas chamber for example.

The cost of dismantling turbine blades is not only considerable from the labor cost involved but also the "down time" of the turbine is increased which can render such operations commercially unacceptable.

The cost of repairing a turbine blade which has not been provided with a Stellite shield and which is merely repaired by brazing or welding a new piece of chrome steel to the blade is relatively modest and a rather more simple operation.

Unfortunately, the long term wear characteristics of a Stellite shield are not provided and hence such a repaired blade will, in a relatively short space of time, required further repair.

SUMMARY OF THE INVENTION

It is an object of the present invention to provide a method of repair that overcomes or reduces the above-mentioned problems.

According to one aspect of the present invention we provide a method of repairing a damaged part of the leading edge of a turbine blade, said method comprising the steps of:

(a) removing the damaged part from the leading edge to leave a cut-out in the turbine blade;

(b) preparing an insert from a material compatible with the material from which the turbine blade is made, the dimensions of said insert being substantially the same as the dimensions of said cut-out;

(c) hardening that part of the insert which will present the leading edge part of the turbine blade when secured to the turbine blade, said hardening leaving an edge region of said insert adapted to abut the blade being substantially unaffected by said hardening;

(d) securing said insert to said turbine blade by welding or brazing and using weld or braze material of a relatively ductile nature so as to provide a cushion between said blade and said insert; and (e) subjecting said insert and at least that part of the blade in the region of said insert to a stress relieving heat treatment process.

Preferably, the machine part comprises a part of a high velocity fluid flow machine and conveniently comprises a turbine.

Preferably, the method of repair is accompanied by heating the turbine blade, which heating may occur during:

(a) a period prior to said welding or brazing operation;

(b) the welding or brazing operation;

(c) a period after said welding or brazing operation.

Preferably, the heating of the machine part is carefully controlled so as to achieve desired temperatures in various parts of the turbine blade.

Preferably, said heating is controlled in a manner that tends to counter any distortion of the blade which may occur during the welding or brazing operation.

Preferably, said method further includes the method of manufacturing an insert as aforedescribed, testing said insert so that the properties thereof are known, both after manufacture and after securing to material the same as that from which a turbine blade is made, making any alteration to the conditions under which said insert is manufactured to enhance both the life of said insert and its ease of securement to the turbine blade or either one thereof and manufacturing said insert under said enhanced conditions for securement to turbine blades.

It is another object of the present invention to provide an insert to enable repair in accordance with the abovementioned method of repair.

According to a further aspect of the invention we provide an insert for securing to a turbine blade, said insert having a first part of a material of high durability and a second part of a material the same as or compatible with the material of the turbine blade to which it is to be secured or is secured.

Preferably, the machine part comprises a turbine blade.

Preferably, said insert may be made from material the same as that of the machine part and said second part may be produced by selectively hardening a part of the insert by any suitable treatment such as heat treatment, or coating said insert with durable material.

The weld or brazing material itself, is of a relatively ductile nature and may provide further isolation between the "impact region" of the leading edge of the turbine blade, particularly at its outer end, and the remainder of the blade thus providing a cushion to minimise the propagation of cracks which may first appear in the leading edge of the turbine blade.

It is further envisaged that an insert as aforedescribed may be attached to the blade by a mechanical connection such as a "dovetail" connection.

In the case where the insert has the first part produced by hardening of a part of a material the same as or compatible with that of the material of the turbine blade, then means may be provided to ensure that a part of said insert is not affected by the handening process. It is also envisaged that, for example, where said insert is treated by the application of heat, for example induction hardening, then a heat sink may be provided so as to minimise the effect of the application of considerable heat to harden the insert, to least over a part thereof that is to be joined to the turbine blade.

Inserts as above described may be secured to a new turbine blade to help ensure that they have as long a service life as possible before repair is required.

The insert, the subject of the present invention, provides significant advantages in the repair of machines in that not only can the insert be made under very carefully conditions so that the properties thereof are well known, but relatively basic materials may be used which are subject to hardening processes while omitting, by masking for example, the hardening of the material in the area where it has to be attached to the machine part such as a turbine blade.

It is envisaged that, particularly in the case of repair of a turbine blade, the insert may be made of a size such that the position of the weld or braze to the turbine blade is in an area which is unlikely to receive substantial damage in use of the turbine.

Such selective positioning of the join area enables a relatively soft weld material to be used, such as Inconel, providing a ductile barrier required to prevent the propagation of cracks between the insert and the blade.

Where it is not possible to provide the join in an area which would not be subject to impact and erosion, then it is envisaged that the weld material may be provided with a cap of very hard weld material such as an alloy containing 0.17 to 0.22% carbon, 0.2 to 0.3% nickel, 12 to 14% chromium, 0.1% molybdenum and 0.02% vanadium which, even though may be a very thin layer, provides an erosion barrier to the weld material itself whilst still leaving the ductile nature of the soft weld material intact.

One method of hardening an insert may comprise chromising involving insertion of the part into a powdered compound and in which case some masking of the part will be necessary to ensure that the area of the insert to be joined to the machine part is still of a ductile nature.

The material of the insert may comprise a cobolt-free alloy steel having approximately 19% nickel, 3% molybdenum and 1.4% titanium.

BRIEF DESCRIPTION OF THE DRAWINGS

The invention will now be described in more detail, by way of example only, with reference to the accompanying drawings, wherein.

DESCRIPTION OF THE PREFERRED EMBODIMENTS

Figure 1:
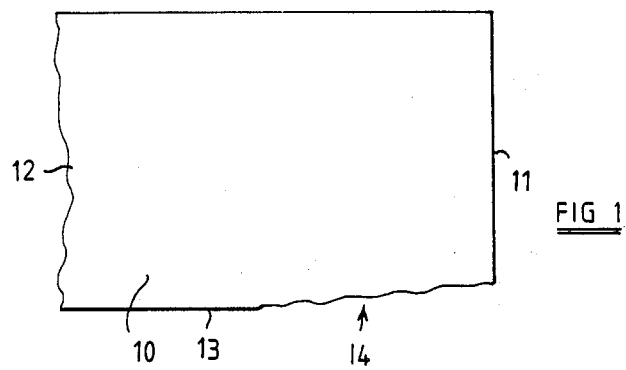
FIG. 1 is a diagrammatic view of a damaged turbine blade.

Referring first to FIG. 1 there is shown a turbine blade 10 which has an outer end 11 and a root end 12. As aforedescribed, most damage occurs to the leading edge 13 and in particular the outer end of the leading edge 13 in the area generally indicated at 14.

Figure 2:
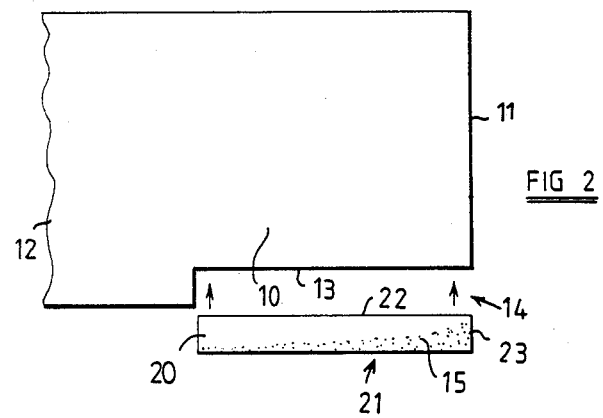
FIG. 2 is a view of the blade shown in FIG. 1 with the damage part removed and an insert in spaced relation therewith.

Referring now in addition to FIG. 2, the damaged area 14 may be removed by cutting a piece out of the turbine blade and securing thereto an insert 15 by a welding or brazing operation.

Figure 3:
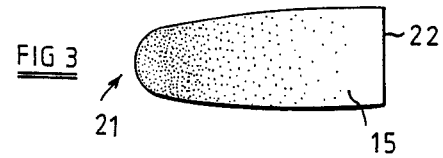
FIG. 3 is a sectional view through one embodiment of insert.

Referring now to FIG. 3, one embodiment of insert is shown in section, the insert 20 being made from, for example, a piece of chrome steel similar to the material from which turbine blades are made and which has had the leading edge region 21 subjected to a hardening process, for example induction hardening or chemical treatment.

The induction hardening of the region 21, the extent of which is intended to be shown by the stippling in the illustration shown in FIG. 3, does not extend completely throughout the insert 20 and the end region 22 is substantially free of any effect due to induction hardening.

It is envisaged that for example the end 22 may be kept substantially free from the effect due to induction hardening by careful positioning of the induction hardening apparatus and providing a heat sink in the region of the end 22 such that the temperature of this part of the insert is not excessively raised.

It is further envisaged that whereas the whole insert may be subjected to extreme temperature changes to effect hardening thereof, the region 22 could subsequently be treated in a manner to render it more ductile and so as to return, at least this part of the insert, to its original condition.

It will be appreciated that it is not only the region 22 of the insert 15 that has to be relatively free of the effect of the hardening process but also the region 23, as can best be seen in FIG. 2, since this additional region has to be secured to the turbine blade 10.

Figure 4:
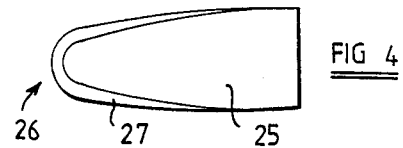
FIG. 4 is a sectional view through a second embodiment of insert.

Referring now to FIG. 4, an alternative form of insert is shown and comprises a part 25 which initially has its leading edge generally indicated at 26 of a profile somewhat slimmed or reduced from the normal profile of the blade and which is subsequently built up by deposition by any suitable manner of a very hard material 27.

The deposition continues until the insert 25 has achieved the desired shape so that it may be joined to a turbine blade such as the turbine blade 10, the profile of the complete article being as intended.

It is envisaged that the material 27 may be deposited in any manner which gives a durable effect, for example the material could be laid thereon in a fused state as in a welding operation, or could be secured thereto in a sintering or sputtering operation, the nature of the material 27 being such as to provide a very durable finish to the insert 25.

Figure 5:
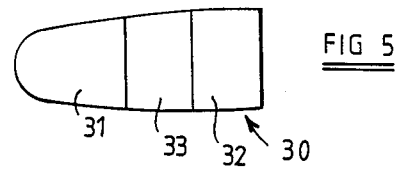
FIG. 5 is a sectional view through a third embodiment of insert.

Referring now to FIG. 5, a still further embodiment of insert is shown, the insert generally indicated at 30 comprises a first part 31 of very hard material, a second part 32 of a material the same as or compatible with the material of the turbine blade to which it is to be affixed and an intermediate zone 33 of a material capable of being satisfactorily secured to the hard material 31 and the (turbine blade) material 32.

It is envisaged that in some circumstances a piece of material 31 may be directly secured to the material 32, for example by a welding or brazing operation, or possibly through a mechanical band such as a type of dovetail connection. However, in some circumstances the permanent band between the first part 31 and second part 32 may be considerably enhanced by the provision of an intermediate material 33 having properties such as provide a buffer zone between the hard material 31 and turbine blade material 32.

Figure 6:
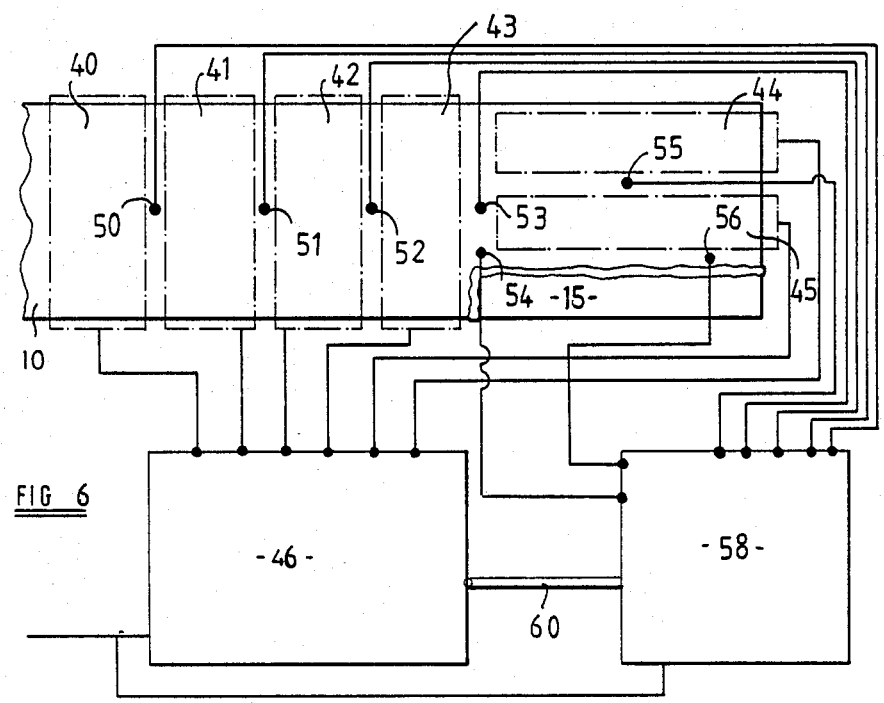
FIG. 6 is an illustration of a turbine blade being repaired and accompanying heating apparatus.

Referring now to FIG. 6, there is shown a turbine blade 10 and an insert 15 secured in position by welding, through if preferred the insert could be secured by mechanical means such as co-operating interengaging surfaces one on the insert and one on the turbine blade itself.

FIGS. 6 also shows a plurality of heating means such as electrically energisable heating elements 40, 41, 42, 43, 44 and 45 all selectively connected to a control panel 46.

A plurality of temperature sensing means such as thermocouples are shown at 50, 51, 52, 53, 54, 55 and 56 and are connected to a further control panel 58 which sends instructions through connection 60 to the heating control means 46.

The turbine blade 10 can thus be heated during the securing operation of the insert to the turbine blade both prior to any welding or brazing of the insert to the blade during the welding or brazing operation and after the brazing or welding operation to provide stress relief in a very carefully controlled manner in accordance with known desiderata to minimise any detrimental effect to the turbine blade 10 by the application of considerable thermal energy during the welding or brazing operation.

Figure 7:
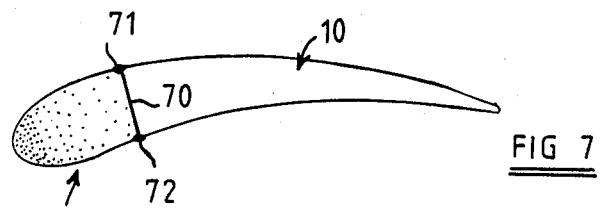
FIG. 7 is a sectional view through a blade to which an insert has been secured.

FIG. 7 is a section through a turbine blade in which the insert 15 has been secured to the blade 10 by brazing, the braze material being shown at 70 with excess braze material left after the welding operation shown at 71 and 72.

Figure 8:
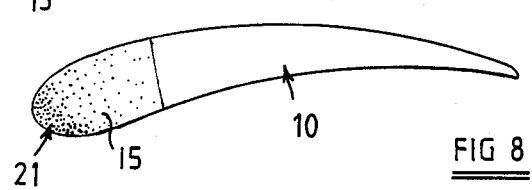
FIG. 8 is a view of the repaired blade.

Referring now to FIG. 8, the excess material 71 and 72 has been removed by grinding, for example, to leave a composite turbine blade having the insert 15 secured thereto, the insert providing a hardening edge region 21.

Figure 9:
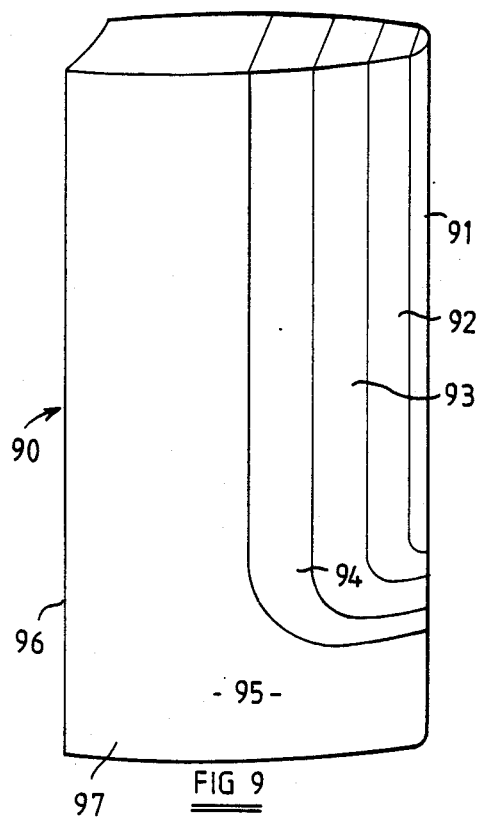
FIG. 9 is a sectional view through an insert indicating a progressive hardness value therethrough.

Referring now to FIG. 9, there is shown another inert suitable for connection to a turbine blade, nozzle or the like, the insert 90 having a leading edge 91 therein of a width of a few millimeters, for example two or three millimeters, of a first relatively high hardness, for example approximately 500 Hv, a second area 92 of greater width, for example 10 mm or 15 mm of a hardness value that may be slightly greater than the hardness value of area 91, for example 500/550 Hv, a third area 93 of a width similar to or slightly greater than the width of area 92, for example 15 mm to 20 mm of a hardness value considerably reduced from areas 91 and 92, for example between 300/400 Hv.

A fourth area 94 may have a width greater than areas 92 and 93, for example 20 mm to 30 mm and once again of a reduced hardness value, for example in the region 200/225 Hv.

If the insert is made of a material the same as that to which it is to be secured, for example if part of a turbine blade, then the material might be 12% chrome steel and the typical hardness value of the blade itself may be about 200 Hv and it is envisaged that the area 95 will have a hardness value a little greater than that of the turbine blade since inevitably there will be some "spillover" of the hardening of the regions 91 and 94.

It is envisaged that the width of area 95 will be greater than the collective width of areas 91 to 94 and thus the edge region 96, 97 the hardness value of the insert 90 should be substantially the same or very slightly greater than the hardness value of the blade material to which it is to be secured.

Whereas the above description has had specific application to the leading edge portion thereof at its outer end, it will be appreciated that an insert according to the present invention may be secured to any part of a machine and in particular a high velocity fluid flow machine such as a turbine and the present invention has particularly reference to turbine parts such as a turbine blade, rotor, stator or nozzle, where damage has occurred.

The features disclosed in the foregoing description, or the accompanying drawing, expressed in their specific forms or in terms of a means for performing the disclosed function, or a method or process for attaining the disclosed result, or a class or group or group of substances or compositions, as appropriate, may, separately or any combination of such features, be utilised for realising the invention in diverse forms thereof.

I claim:

1. A method of repairing a damaged part of the leading edge of a turbine blade, said method comprising the steps of:
    (a) removing the damaged part from the leading edge to leave a cut-out in the turbine blade;
    (b) preparing an insert from a material compatible with the material from which the turbine blade is made, the dimensions of said insert being substantially the same as the dimensions of said cut-out;

(c) hardening that part of the insert which will present the leading edge part of the turbine blade when secured to the turbine blade, said hardening leaving an edge region of said insert, adapted to abut the blade, substantially unaffected by said hardening;

(d) securing said insert to said turbine blade by welding or brazing and using weld or braze material of a relatively ductile nature so as to provide a cushion between said blade and said insert; and (e) subjecting said insert and at least that part of the blade in the region of said insert to a stress relieving heat treatment process.

2. A method of repair according to claim 1 wherein said weld or braze material is provided along any external surface thereof with a covering of a hard metallic material.

3. A method of repair according to claim 1 wherein said method involves the application of controlled heating to the turbine blade, which heating occurs during:
(a) a period prior to any welding or brazing operation;
(b) during the wleding or brazing operation;
(c) a period after said welding or brazing operation.

4. A method of repairing a turbine blade according to claim 1 wherein said hardening of said insert comprises the step of subjecting said insert to induction heating.

5. A method of repairing a turbine blade according to claim 1 wherein said insert is subjected to a coating of a durable material.

6. A method of repairing a turbine blade according to claim 1 wherein said insert is subjected, prior to securing to said turbine blade to a chemical hardening treatment.

7. A method of repairing a turbine blade according to claim 1 wherein said insert is subjected to a hardening treatment wherein said insert is provided with a durable hard edge region adapted to form the leading edge of the turbine blade and terminating adjacent an edge region to be affixed to the turbine blade in a material the same as or compatible with that from which the turbine blade is made, the material of said insert between said durable hard edge region adapted to form the leading edge and said edge region adapted to be secured to the turbine blade being of a variable hardness, the hardness decreasing in a direction away from said leading edge region.

* * * * *